April 23, 1963 — I. H. MORRISON — 3,086,934
FUEL ELEMENTS FOR NUCLEAR REACTORS
Filed July 28, 1960
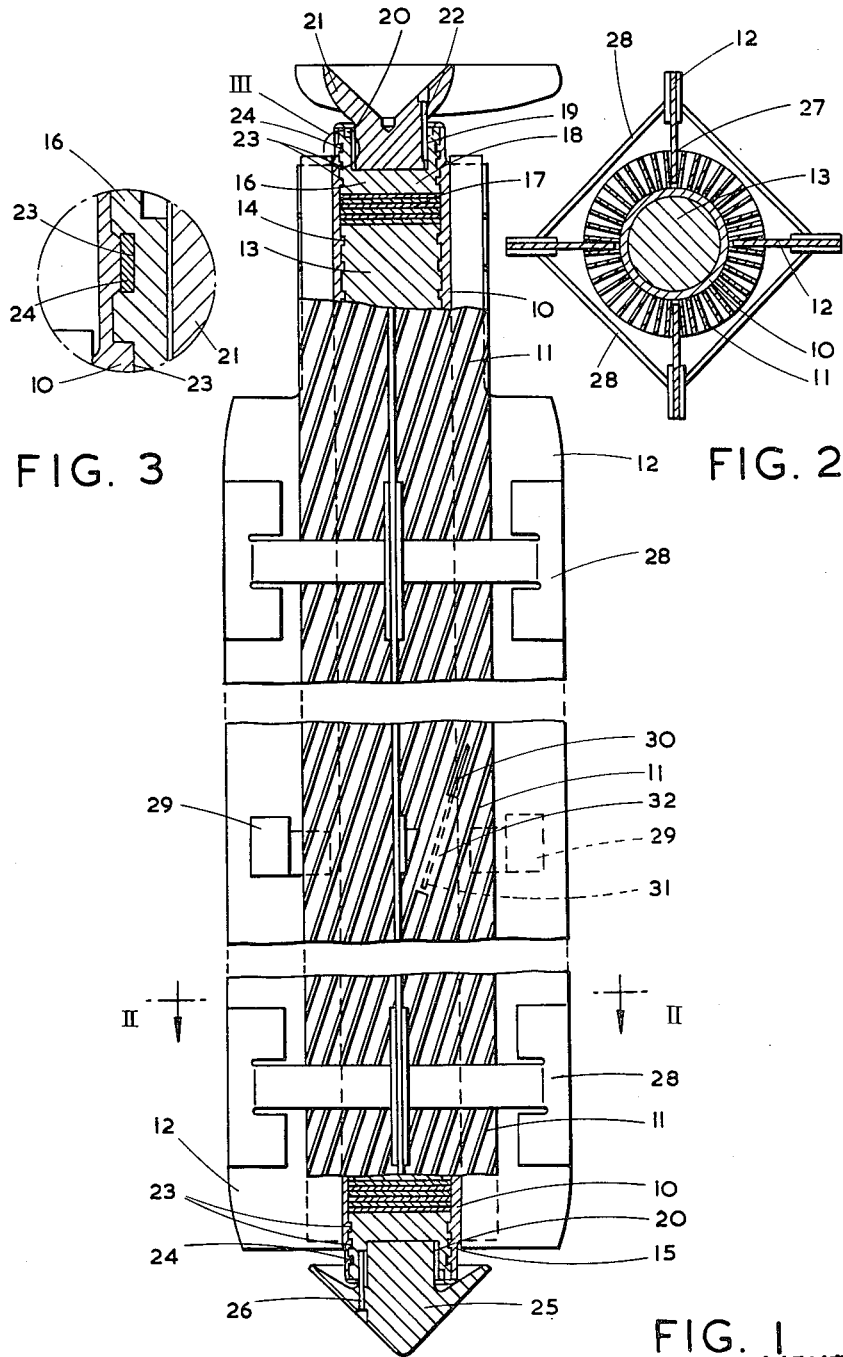

United States Patent Office 3,086,934
Patented Apr. 23, 1963

3,086,934
FUEL ELEMENTS FOR NUCLEAR REACTORS
Ian Hugh Morrison, Ashton, Preston, England, assignor to United Kingdom Atomic Energy Authority, London, England
Filed July 28, 1960, Ser. No. 45,924
Claims priority, application Great Britain July 31, 1959
2 Claims. (Cl. 204—193.2)

This invention relates to nuclear reactor fuel elements of the kind comprising a nuclear fuel member enclosed in a protective sheath.

It is appreciated that the containment by a sheath of fission products obtained by burning nuclear fuel cannot always be guaranteed and hence the current design of nuclear reactor includes what has become known as "Burst Cartridge Detection (B.C.D.) apparatus," that is apparatus to detect fission products (or their decay products) which may escape through leakage paths in the sheaths.

Experience obtained in operating pressurised carbon dioxide cooled nuclear reactors using uranium fuel members enclosed in magnesium alloy sheaths is that the B.C.D. apparatus shows one or other of two kinds of sheath failure. In one failure a slowly increasing record of fission product release is detected whilst in the other kind of failure a very rapidly increasing signal is obtained. The latter kind of failure is naturally regarded as the more serious and was considered to be the more inexplicable.

However, investigation has brought to light the possibility of a leakage in a fuel element sheath of such a character that detectable fission products do not escape out from the fuel to the reactor coolant, but rather, coolant leaks into the fuel member so that oxidation of the fuel member takes place until the volume expansion caused by oxide is enough to provide a larger path through which detectable fission products can diffuse out against the coolant gas pressure to give a large signal on the B.C.D. apparatus.

It is accordingly an object of the present invention to provide a fuel element in which the liability of large fission product leakage from the fuel element can be avoided by earlier detection of a small leakage.

The fuel element according to the present invention comprises a nuclear fuel member contained within a protective sheath, the sheath having at least one minor part (such as an end cap) joined with the main body of the sheath, characterised in that an insert of nuclear fuel material is placed in proximity to the joint between minor part and main body of the sheath.

In a preferred form of the invention a groove is defined between the inside of the sheath and the end cap and the insert of nuclear fuel material is located inside the groove.

It is thought that the most likely source of fission product leakage in fuel elements according to the invention is at the joint between the minor part and sheath and, should this occur, the leakage of fission products will be from the insert of nuclear fuel material in proximity with the joint. The fission products will therefore have a very short path to travel and should diffuse into the coolant and reach the B.C.D. apparatus before they decay and thereby give an early warning of defect.

A fuel element embodying the invention will now be described by way of example with reference to the accompanying drawings in which:

FIG. 1 is a longitudinal sectional elevation.

FIG 2 is a cross section along the line II—II in FIG. 1.

FIG. 3 is a detail of the area of FIG. 1 outlined by the chain dotted circle III.

This fuel element has a sheath 10 with finned surface consisting of forty-start helical finning 11 and four longitudinal splitter fins 12. The length is forty-three inches overall. The element has a fuel rod 13 of magnesium reduced uranium which is adjusted with iron and aluminium to give a fine grain structure after transverse quenching from beta phase and annealing in the alpha phase so that it will be less susceptible to wrinkling during irradiation. The rod 13 is 1.15 inches in diameter with grooves 14 at intervals during its length. During manufacture the can is hydraulically pressurised into these grooves to prevent the sheath 10 and rod 13 deforming (ratchetting) with respect to one another due to differential thermal expansion during thermal cycling. The rod 13 is machined after heat treatment and shortly before confining in its sheath 10 to minimise the oxide film with consequent reduction in temperature drop between outer face of rod 13 and inner face of sheath 10.

The fins 11 have a 16 inch lead and an overall length of 41¾ inches with a sheath wall thickness of .060–0.075 inch. The fins 11 finish 7/16 inch short of the end of the can and each have a radius 15 to minimise strain concentration. The internal diameter of the sheath 10 is 1.17 inches and the outside diameter over the fins 11 is 2.25 inches. The ends of the sheath 10 are bored out to a diameter of 1.19 inches and a depth of 1.2 inches to accommodate end caps 16 and alumina insulating discs 17. The fins 11 have a fin tip taper of 0.047 to 0.027 inch. The sheath 10 is made from "maganox" magnesium alloy and is impact extruded.

The end caps 16 have a base part 18 and a skirt part 19. The upper end cap 16 has an internal thread 20 to take a threaded end fitting 21 which is retained by a locking pin 22 and the lower end cap 16 has an internal thread 20 to take a threaded end cone 25 which is locked by a pin 26. The pins 22 and 26 are locked by peening.

The outer surface of each of the end caps 16 has three circumferential grooves 23 and the caps 16 are .002 inch oversize with respect to the diameter of the ends of the sheath 10 so that the end caps 16 are an interference fit in the sheath 10. The caps 16 are joined and sealed with the sheath 10 at an edge sealing weld made by an argon arc process with 0.15% addition of nitrogen to the argon.

As shown in the detail of FIG. 3, the outermost of the grooves 23 in both end caps 16 is fitted with a band of uranium foil 24 which is 0.40 inch wide and 0.008 inch thick. During pressurisation of the fuel element to force the sheath 10 into the grooves 14 in the fuel rod 13 the sheath 10 is also forced into the grooves 23 in the end caps 16 thus strengthening the joint between the end caps 16 and the sheath 10.

The splitter fins 12 which are 41 inches long and 0.062 inch thick are loosely fitted in longitudinal slots 27 milled in the fins 11. The splitter fins 12 project 0.2 inch beyond the fins 11 in an axial direction to maintain their full effect even after the fuel element has expanded lengthwise under irradiation. The splitter fins are loosely located by braces 28 and locked by clips 29 engaging between the fins 11. The fuel element is fitted with thermocouples 30 in drillings 31 in a solid part 32 left between two of the fins 11.

Should leakage occur at the joint between either of the end caps 16 and the sheath 10, fission products generated in the corresponding uranium foil 24 have only a short path to travel before entering the coolant gas stream and passing to the Burst Cartridge Detection apparatus. By reason of the shortness of the path in escaping from the fuel element the fission products have not time to decay to an inappreciable level before they reach the B.C.D. apparatus and hence give early warning of the defect in the fuel element.

I claim:

1. A fuel element for a nuclear reactor comprising a nuclear fuel member, a protective sheath containing said fuel member, an end closure member for said sheath defining a closure face in extended contact with said sheath, a sealing weld between the end closure member and the sheath and an insert of nuclear fuel material between said closure face and the sheath in a region intermediate the sealing weld and the nuclear fuel member.

2. A fuel element for a nuclear reactor comprising a nuclear fuel member, a tubular protective sheath for said fuel member, an end closure member for said sheath defining a closure face in extended contact with said sheath, a sealing weld between the end closure member and the sheath, an annular groove defined between said closure face and the sheath in a region intermediate the sealing weld and the nuclear fuel member and an insert of nuclear fuel located in said groove between the closure face and the sheath.

References Cited in the file of this patent

UNITED STATES PATENTS

| | | |
|---|---|---|
| 2,813,070 | Fermi et al. | Nov. 12, 1957 |
| 2,871,558 | Colbeck | Feb. 3, 1959 |
| 2,873,853 | Burton | Feb. 17, 1959 |
| 2,885,335 | Moore et al. | May 5, 1959 |
| 3,037,924 | Creutz | June 5, 1962 |

OTHER REFERENCES

Nuclear Power, July 1959, pp. 77–79.